United States Patent [19]

Wan

[11] Patent Number: 5,791,430
[45] Date of Patent: Aug. 11, 1998

[54] EMERGENCY SEAT RECLINE SYSTEM FOR AUTOMOBILE AND METHOD THEREFOR

[76] Inventor: Wayne Wan, 1118 NE. 2nd Ct., Apt. 2, Hallandale, Fla. 33009

[21] Appl. No.: 689,364

[22] Filed: Aug. 8, 1996

[51] Int. Cl.$^6$ ................................................. B60K 28/12
[52] U.S. Cl. .................... 180/282; 280/734; 280/753; 701/49
[58] Field of Search ..................... 180/271, 282; 280/734, 743.1, 728.1, 728.2, 730.1, 753; 701/49

[56] References Cited

U.S. PATENT DOCUMENTS

| | | | |
|---|---|---|---|
| 5,074,583 | 12/1991 | Fujita et al. | 280/735 |
| 5,088,841 | 2/1992 | Ikegaya et al. | 297/344 |
| 5,203,600 | 4/1993 | Watanabe et al. | 180/282 |
| 5,398,185 | 3/1995 | Omura | 180/282 |
| 5,430,649 | 7/1995 | Cashler et al. | 180/282 |
| 5,492,368 | 2/1996 | Pywell et al. | 180/282 |
| 5,497,327 | 3/1996 | Takaya et al. | 180/282 |
| 5,605,202 | 2/1997 | Dixon | 180/282 |

*Primary Examiner*—J. Woodrow Eldred
*Attorney, Agent, or Firm*—Robert C. Kain, Jr.

[57] ABSTRACT

The emergency reline system for an automobile is used in conjunction with an air bag system and a reclining seat system. The seat is pivotally movable by a motor upon application of a reclining motor control signal. The emergency recline system includes a sensor which detects unwanted deceleration and which generates a trigger signal. The trigger signal is delayed by a delay circuit for a predetermined period of time. The delayed trigger signal is then applied as the reclining motor control signal to the motor such that after the predetermined time, the delayed trigger signal reclines the seat. This relieves the pressure developed by the deployed air bag on the driver or the passenger in the seat. A method for reclining the seat includes sensing unwanted deceleration, generating a trigger signal, delaying the trigger signal for a predetermined time, and then applying that delayed trigger signal as the reclining motor control signal to the motor or motor control. To insure that the reclining seat is moved by the motor, a fail safe or power backup system may also be utilized.

11 Claims, 2 Drawing Sheets

EMERGENCY SEAT RECLINE SYSTEM FOR AUTOMOBILE AND METHOD THEREFOR

The present invention relates to an emergency system for a reclining seat in an automobile or other vehicle upon deployment of an airbag.

BACKGROUND OF THE INVENTION

Automobiles and other types of vehicles sometimes include air bags which are deployed or inflated during unwanted deceleration of a vehicle. This type of deceleration may occur during a head-on collision of the vehicle with another vehicle or with a stationery object. Upon deployment of the air bag, forward movement of passengers and drivers in the vehicle is restricted by the deployed air bag.

However, a problem exists in that the air bag, after deployment and after the vehicle stops, sometimes harms the driver or passenger. The driver or passenger may be trapped in the vehicle by the air bag and may suffocate or be unduly restricted after the deceleration of the vehicle is dissipated.

U.S. Pat. No. 5,088,841 to Ikegaya et al. discloses a power seat mechanism and particularly a seat which is pivotally movable by a motor upon application of a reclining motor control signal. U.S. Pat. No. 5,074,583 to Fugita et al. discloses an air bag system for an automobile.

OBJECTS OF THE INVENTION

It is an object of the present invention to provide an emergency recline system for an automobile or other vehicle.

It is a further object of the present invention to provide an emergency recline system such that, upon deployment of the air bag and after a predetermined time period, the seat reclines further to reduce the pressure on the driver or passenger.

It is an additional object of the present invention to provide an emergency recline system with a fail safe or a power backup system which supplies power to the motor moving the seat after deployment of the air bag such that the seat reclines.

It is a further object of the present invention to provide an emergency recline system which may be added to the air bag and recliner seat systems in the automobile.

It is a further object of the present invention to provide a method for reclining the seat after deployment of the air bag.

SUMMARY OF THE INVENTION

The emergency recline system for an automobile is used in conjunction with an air bag system and a reclining seat system. The seat is pivotally movable by a motor upon application of a reclining motor control signal. The emergency recline system includes a sensor which detects unwanted deceleration and which generates a trigger signal. The trigger signal is delayed by a delay circuit for a predetermined period of time. The delayed trigger signal is then applied as the reclining motor control signal to the motor such that after the predetermined time, the delayed trigger signal reclines the seat. This relieves the pressure developed by the deployed air bag on the driver or the passenger in the seat. A method for reclining the seat includes sensing unwanted deceleration, generating a trigger signal, delaying the trigger signal for a predetermined time, and then applying that delayed trigger signal as the reclining motor control signal to the motor or motor control. To insure that the reclining seat is moved by the motor, a fail safe or power backup system may also be utilized.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to an emergency seat recline system for an automobile and a method therefor.

Figure 1:
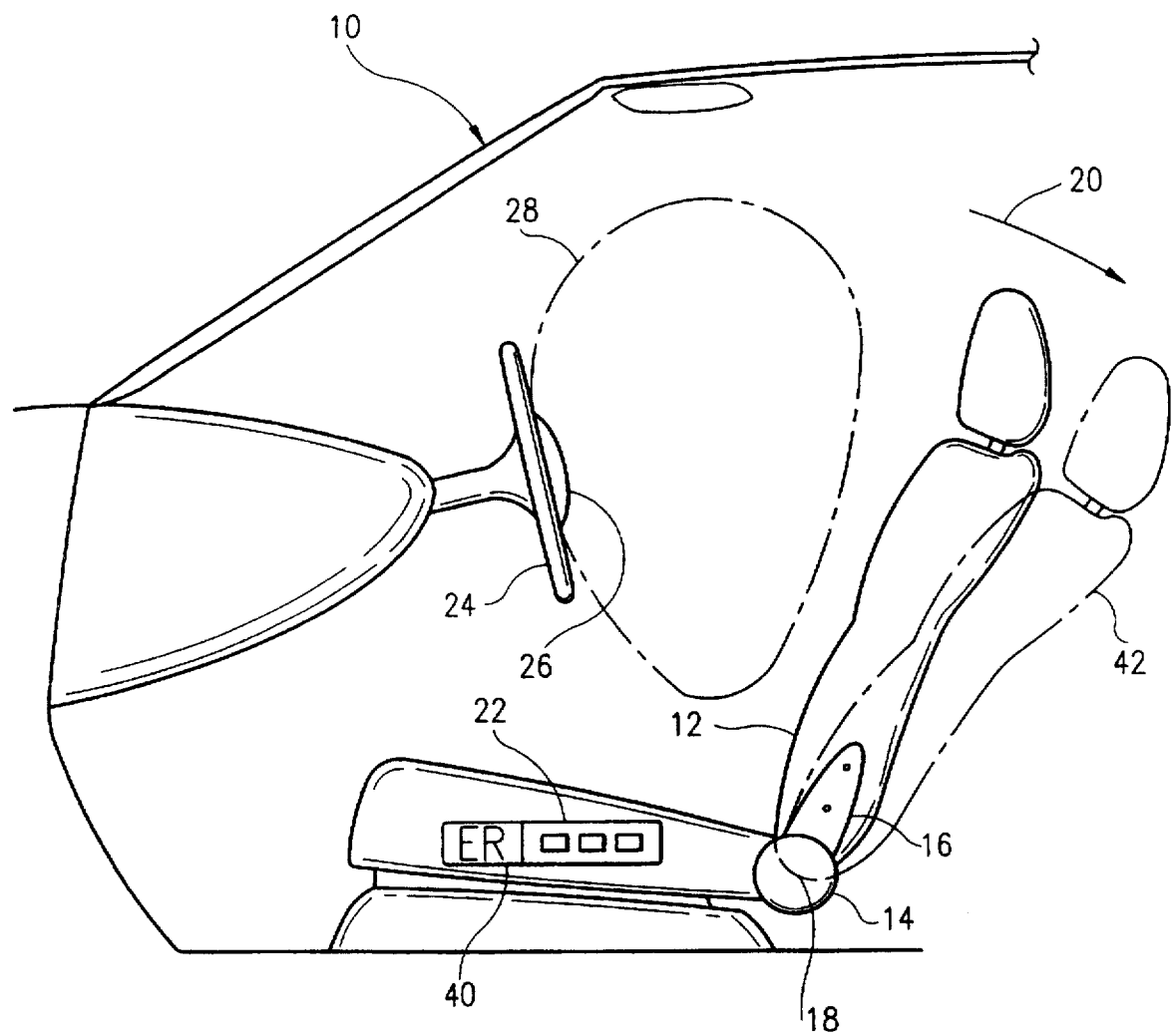
FIG. 1 diagrammatically illustrates an interior of a vehicle with a reclining seat and the position of the deployed air bag and the reclined seat in phantom lines.

FIG. 1 diagrammatically illustrates vehicle 10 having seat 12. Seat 12 includes, in its interior, a motor 14 and a mechanism 16 that reclines the seat pivotally about point 18. Motor 14 pivotally moves seat 12 in the direction shown by arrow 20 upon application of a reclining motor control signal. During normal, non-emergency use, the driver or passenger actuates the reclining seat control via control circuit panel 22. This enables the driver or the passenger to recline the seat backward (in direction 20) or forward as necessary.

FIG. 1 shows seat 12 placed adjacent steering wheel 24. Steering wheel 24 includes nonactivated air bag 26. Upon inflation or deployment of air bag 26, the air bag takes on the approximate shape of deployed bag 28 shown in phantom lines. Since the driver is trapped or captured between deployed bag 28 and seat 12 in order to limit the forward motion of the driver during unwanted deceleration, after the vehicle stops, the driver is sometimes injured or placed in severe discomfort due to deployed bag 28.

The present invention utilizes an emergency recline ER circuit 40 which is utilized in conjunction with control circuit 22 and particularly the reclining seat control. Briefly, the present invention senses unwanted deceleration and generates a trigger signal. This trigger signal is generated or sensed by emergency recline ER circuit 40. The trigger signal is delayed for a predetermined period of time. In the present invention, this predetermined period of time is estimated to be 3–10 seconds. Thereafter, the delayed trigger signal is applied as a reclining motor control signal to motor 14. Thereafter, seat 12 reclines in the direction shown by arrow 20 to the reclining position 42. In the reclining position, the driver or passenger is no longer trapped between deployed air bag 28 and seat 12. This alleviates the discomfort and may avoid harmful injury to the driver or passenger. Alternatively, the seat could be moved rearward with the reclining motor control signal based upon the delayed trigger signal. The claims appended hereto are meant to cover this type of reclining seat.

Figure 2:
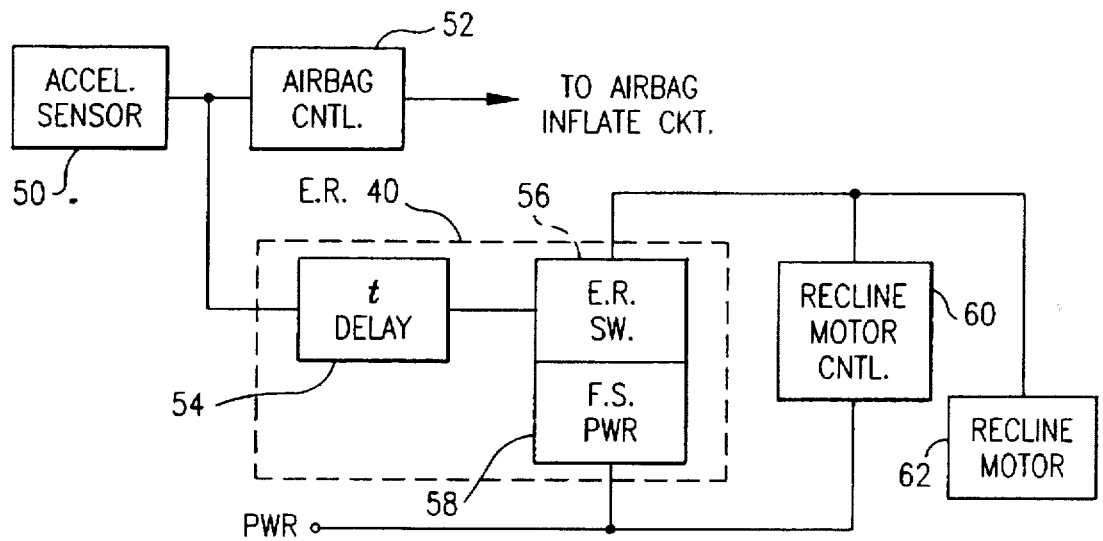
FIG. 2 diagrammatically illustrates the system schematic for the emergency recline system.

FIG. 2 diagrammatically illustrates the major system components of the emergency recline system. Due to the utilization of computer systems in automobiles and vehicles, it is common that automobiles include a means or a unit for sensing unwanted deceleration. A decelerometer is simply an accelerometer set to provide a control signal when excessive negative acceleration is sensed by the circuit. Accordingly, it is common to utilize an accelerometer sensor 50 which generates a signal for the air bag control system 52. The output of air bag control system 52 is applied to the appropriate circuitry to inflate the air bag 26 in FIG. 1.

The output of accelerometer or sensor 50 is fed to emergency recline circuit 40. Circuit 40 includes a time delay unit 54, and emergency recline switch 56 and, in a preferred embodiment, a fail safe backup power supply 58. The emergency recline switch 56 has an output connected to a complementary similar output for the recline motor control circuit 60. Ultimately, the output of the emergency recline switch 56 is applied to the recline motor 62 for seat 12. Power is supplied to the fail safe power or backup power supply 58 as well as to the recline motor control circuit 60 from the vehicle's common electrical power supply.

In operation, the accelerometer 50 detects unwanted deceleration of the vehicle. The resulting signal, a trigger signal, is sensed by time delay circuit 54. Time delay circuit 54 delays that trigger signal for a predetermined period of time (8–10 seconds) and, upon the expiration of that time, generates a delay trigger signal to the emergency recline switch 56. In the preferred embodiment, the emergency recline switch 56 simply generates a converted reclining motor control signal similar to the reclining motor control signal generated by recline motor control 60. This reclining motor control signal activates recline motor 60 to move seat 12 in the direction shown by arrow 20 to recline seat 42 in FIG. 1.

It may not be necessary to provide a fail safe or backup power system 58 for the emergency recline system. However, some automobiles and vehicles disconnect the power to the seat after a crash or an unwanted deceleration. The fail safe power backup 58 is provided to enable the recline motor 62 to be driven. If the control signal to the recline motor 62 is a power signal, emergency recline switch 56 may be a relay that couples fail safe power 58 directly to recline motor 62. The control signal to the relay may be a low voltage, delayed trigger signal. If low voltage electronics is utilized, the delay circuit may be monostable multivibrator (MMV). Clocking signals may be necessary to measure the passage of time in ER circuit 40. The time delay may be programmable via the MMV. The delayed output of the MMV could close the relay controls and connect the ordinary vehicle power to the motor (if no fail safe power is provided) or the fail safe power.

Figure 3:
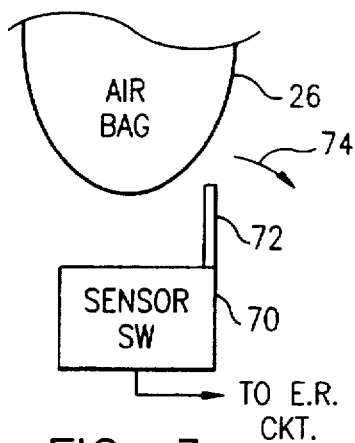
FIG. 3 diagrammatically illustrates a mechanical switch which may be used to sense the deployment of the air bag.

FIG. 3 diagrammatically illustrates that a mechanical switch 70 may be mounted near air bag 26. Upon deployment of the air bag (see non-activated air bag 26 in FIG. 1 as compared with inflated bag 28), mechanical switch lever 72 moves in the direction shown by arrow 74. Upon switch lever 72 moving in the direction shown by arrow 74, sensor switch 70 closes the circuit and that close signal is the trigger signal which is applied to emergency recline circuit 40.

Figure 4:
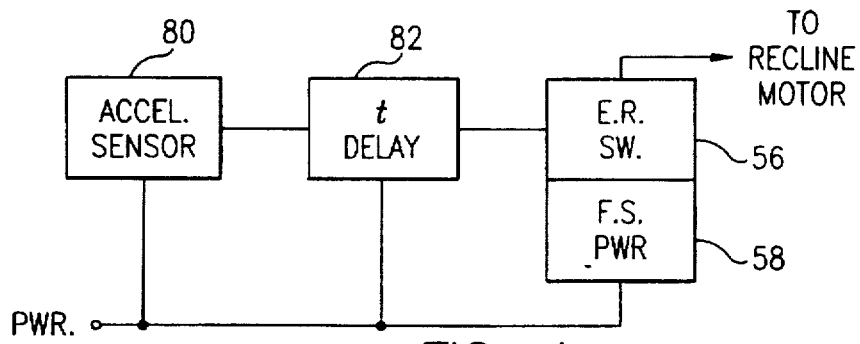
FIG. 4 diagrammatically illustrates an accelerometer which detects the degree of deceleration as part of the emergency recline system.

FIG. 4 shows that the emergency recline circuit 40 may include its own accelerometer or sensor 80. The output of the accelerometer is applied to time delay circuit 82. The output of time delay circuit 82 is applied to emergency recline switch 56. The output of switch 56 is applied to the recline motor. Fail safe power supply 58 may be included to insure that the recline motor for seat 12 is supplied power.

Figure 5:
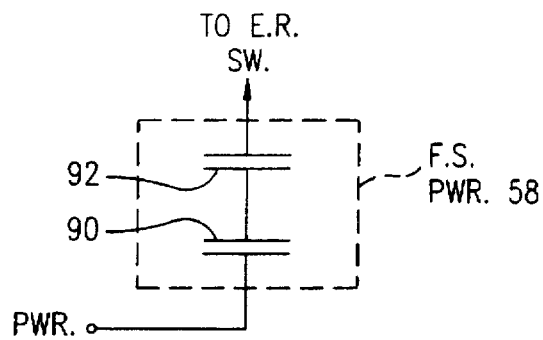
FIG. 5 diagrammatically illustrates one embodiment of the fail safe power supply.

FIG. 5 diagrammatically shows that the fail safe power circuit 58 may include one or two supercapacitors 90, 92. It is known that small-sized, large farad capacitors can store significant amounts of power to drive motors. Upon the loss of power to the recline motor, supercapacitors 90, 92 could be utilized to supply power to recline motor 62 in order to carry out the emergency recline described herein. The capacitors have a farad rating in excess of ½ farads and are smaller than about 1.0 cubic inches. If capacitors are used, a charging circuit and a discharge circuit may be necessary. These are known in the electronics art.

Figure 6:
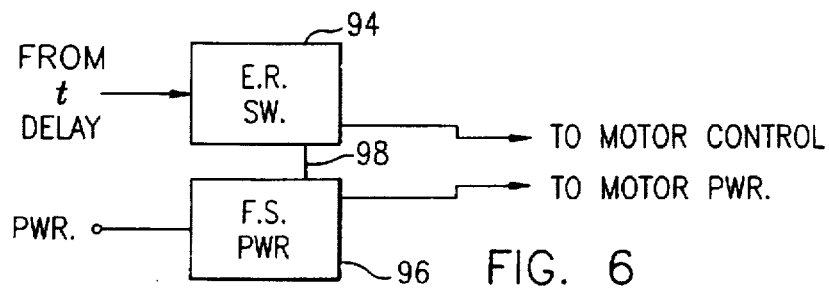
FIG. 6 diagrammatically illustrates the emergency recline switch applied to the motor control and the fail safe power applied to the motor power terminal.

FIG. 6 diagrammatically shows that the emergency recline switch 94 may generate a separate reclining motor control signal applied to the motor control, separate and apart from the fail safe power from fail safe backup power circuit 96. The fail safe power could be applied directly to the power terminal of the motor. In the configuration shown in FIG. 6, the control signal is different from the power signal. It may be necessary to develop a separate control signal from the emergency recline switch 94 to the fail safe power circuit 96 in order to recline or move back the seat. This additional control signal would be applied to line 98.

The claims appended hereto are meant to cover modifications and changes within the spirit and scope of the present invention.

What is claimed is:

1. An emergency recline system for an automobile or other vehicle having an airbag, actuated during unwanted deceleration of the vehicle, and having a reclining seat pivotally movable by a motor upon application of a reclining motor control signal, the emergency recline system comprising:

means for sensing the unwanted deceleration and for generating a trigger signal thereupon;

means for delaying the trigger signal for a predetermined time period;

means for converting the delayed trigger signal into the reclining motor control signal such that after the predetermined time, the delayed trigger signal reclines the seat.

2. An emergency recline system as claimed in claim 1 wherein said airbag is coupled to an airbag control system, said airbag control system having a deceleration sensor therein, and the means for sensing including said deceleration sensor.

3. An emergency recline system as claimed in claim 2 including a power backup system coupled to said means for converting and said motor, said power backup system supplying power to said motor upon application of the delayed trigger signal.

4. An emergency recline system as claimed in claim 1 wherein said means for sensing includes an accelerometer.

5. An emergency recline system as claimed in claim 1 wherein said means for sensing includes a mechanical switch mounted near the airbag, said switch coupled to means for generating the trigger signal, said mechanical switch being actuated upon deployment of said airbag.

6. An emergency recline system as claimed in claim 4 including a power backup system coupled to said means for converting and said motor, said power backup system supplying power to said motor upon application of the delayed trigger signal.

7. An emergency recline system as claimed in claim 5 including a power backup system coupled to said means for converting and said motor, said power backup system supplying power to said motor upon application of the delayed trigger signal.

8. A method for reclining a seat in an automobile or other vehicle during sudden, unwanted deceleration and after deployment of an airbag therein, said seat being reclined by a motor upon application of a reclining motor control signal, the method comprising the steps of:

sensing the unwanted deceleration and generating a trigger signal thereupon;

delaying the trigger signal for a predetermined time period;

converting the delayed trigger signal into the reclining motor control signal such that after the predetermined time, the delayed trigger signal reclines the seat.

9. A method as claimed in claim 8 including the step of providing backup power to said motor upon application of said delayed trigger signal.

10. A method as claimed in claim 8 wherein the step of sensing includes the step of mechanically sensing the deployment of said airbag.

11. A method as claimed in claim 10 including the step of providing backup power to said motor upon application of said delayed trigger signal.

\* \* \* \* \*